United States Patent [19]

Fukamachi

[11] Patent Number: 4,669,578

[45] Date of Patent: Jun. 2, 1987

[54] MOTOR DRIVEN VALVE

[76] Inventor: Rikuo Fukamachi, 1-44-10 Tezukayama 1-chome, Nara City, Japan

[21] Appl. No.: 839,178

[22] Filed: Mar. 13, 1986

[51] Int. Cl.$^4$ .......................... F03G 1/08; F16K 31/04
[52] U.S. Cl. .................................... 185/40 R; 74/675; 251/71
[58] Field of Search ....................... 185/40 R; 74/675; 251/69, 71, 129.12

[56] References Cited

U.S. PATENT DOCUMENTS 3,279,744 10/1966 Fieldsen et al. .................. 251/71 X
3,430,916 3/1969 Raymond, Jr. ....................... 251/71
3,659,676 5/1972 Witt .................................. 185/40 R
3,808,895 5/1974 Fitzwater .......................... 251/71 X Primary Examiner—Allan D. Herrmann
Attorney, Agent, or Firm—Wenderoth, Lind & Ponack

[57] ABSTRACT

The present invention generally relates to a valve mechanism and more particularly, to a motor driven valve arranged to open or close the valve through rotation of a valve body of the valve by the driving of a reversible motor, and having incorporated therein an improved mechanism for automatic opening or closing of the valve when it becomes impossible to control the valve due to troubles such as power failures, etc.

1 Claim, 4 Drawing Figures

MOTOR DRIVEN VALVE

BACKGROUND OF THE INVENTION

A motor driven valve adapted to selectively open or close the valve by rotating the valve body thereof based on driving by a motor has been conventionally known, and the motor driven valve of this type is generally so arranged that, while the motor is shut down, the rotary shaft of the motor is fixed so as not to be rotatable by a brake mechanism provided inside said motor for preventing the valve body of said valve from being rotated by the pressure of a fluid passing through a flow passage.

Therefore, if it becomes impossible to control the valve for opening and closing due to the inability to pass electric current through the motor due to a power failure or some other troubles, the valve body of the valve remains in the state prior to suspension of the energy supply, and thus, when energization becomes impossible and the valve body is left in the opened state, there has been a possibility that a tank may undersirably overflow. Accordingly, the conventional practice is such that an operator has to manually close the valve at the time as the trouble occurs, but such a practice is not necessarily satisfactory from the viewpoint of security, because it is almost impossible to control a plurality of valves in a short period of time, and thus, there has been a case where some valves are left unclosed desirably.

For eliminating the disadvantages as described above, another arrangement has also been proposed which is adapted to automatically close the valve by changing-over by means of a magnet clutch through utilization of a restoring force of a spiral spring manually wound in advance. The above prior art device, however, not only requires troublesome procedures for the preliminary manual winding of the spiral spring, but also involves a possibility that the spiral spring may be left unwound carelessly, and moreover, since it is necessary to adopt an expensive magnet clutch, the manufacturing unit cost tends to be excessively high, and therefore, the arrangement has not been placed into actual applications as yet.

SUMMARY OF THE INVENTION

Therefore, it is a primary object of the present invention to provide an improved motor driven valve which is superior in operability and requires no manual operations, with substantial elimination of disadvantages inherent in the known motor driven valves of this kind.

A second object of the present invention is to provide a motor driven valve of the above described type which is able to automatically open or close the valve by a restoring force of a spiral spring during power failures, etc., while requiring no clutch operation.

A third object of the present invention is to provide a motor driven valve of the above described type in which a motor for driving the valve body of the valve is also utilized for winding the spiral spring, and thus, the open and close control of the valve and the winding of the spiral spring can be effected by a single motor.

A fourth object of the present invention is to provide a motor driven valve of the above described type which can prevent unexpected accidents by opening or closing the valve through rewinding of the spiral spring based on the functioning of a solenoid, at the same time as the emergencies such as power failures and the like take place.

The present invention has been made to accomplish these and other objects, and the specific construction thereof will become more apparent by the accompanying drawings and detailed description thereof to be given hereinafter.

DETAILED DESCRIPTION OF THE INVENTION

Figure 1:
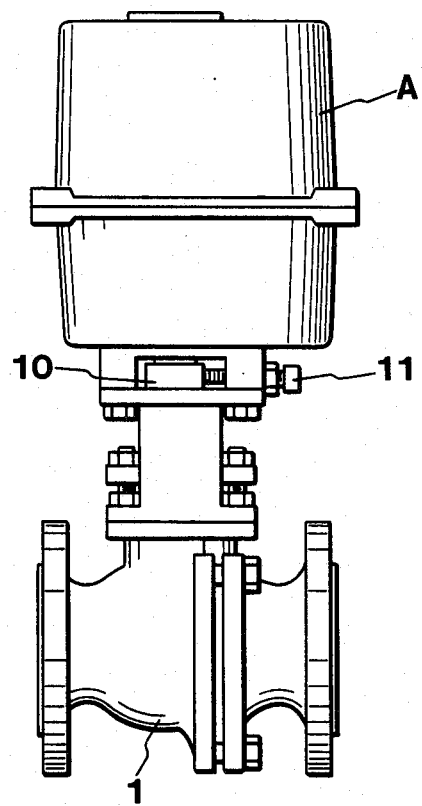
FIG. 1 is a side elevational view showing the external appearance of a motor driven valve according to one preferred embodiment of the present invention.
Figure 2:
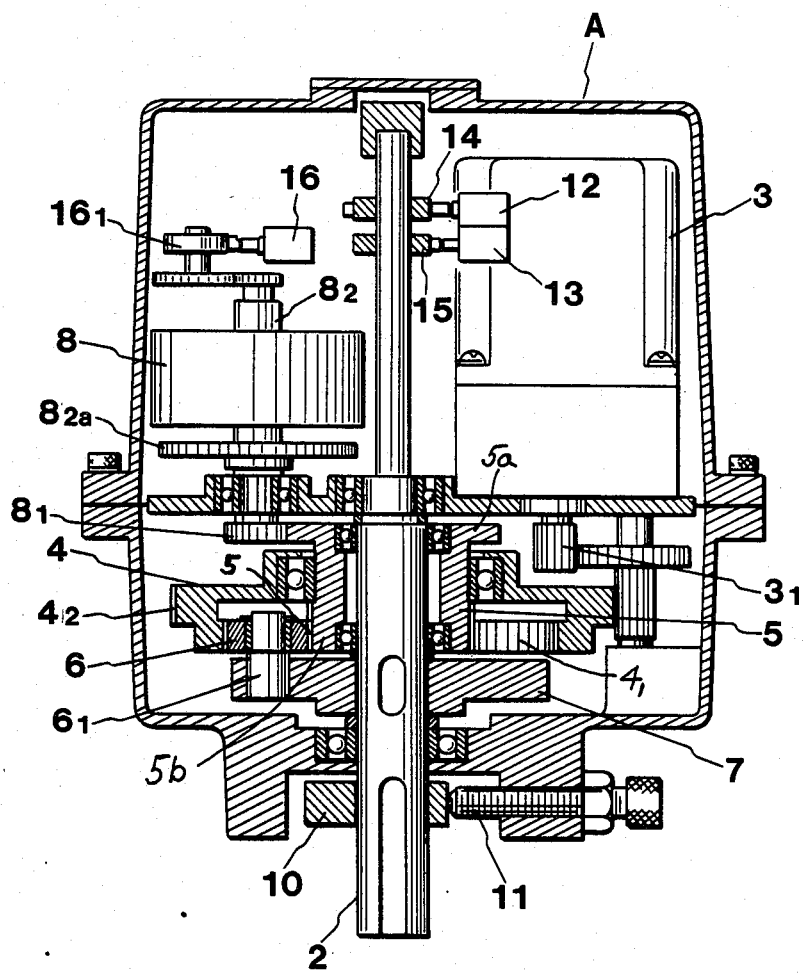
FIG. 2 is a longitudinal side sectional view of a driving section for rotating a rotary shaft of a valve body of the valve shown in FIG. 1.
Figure 3:
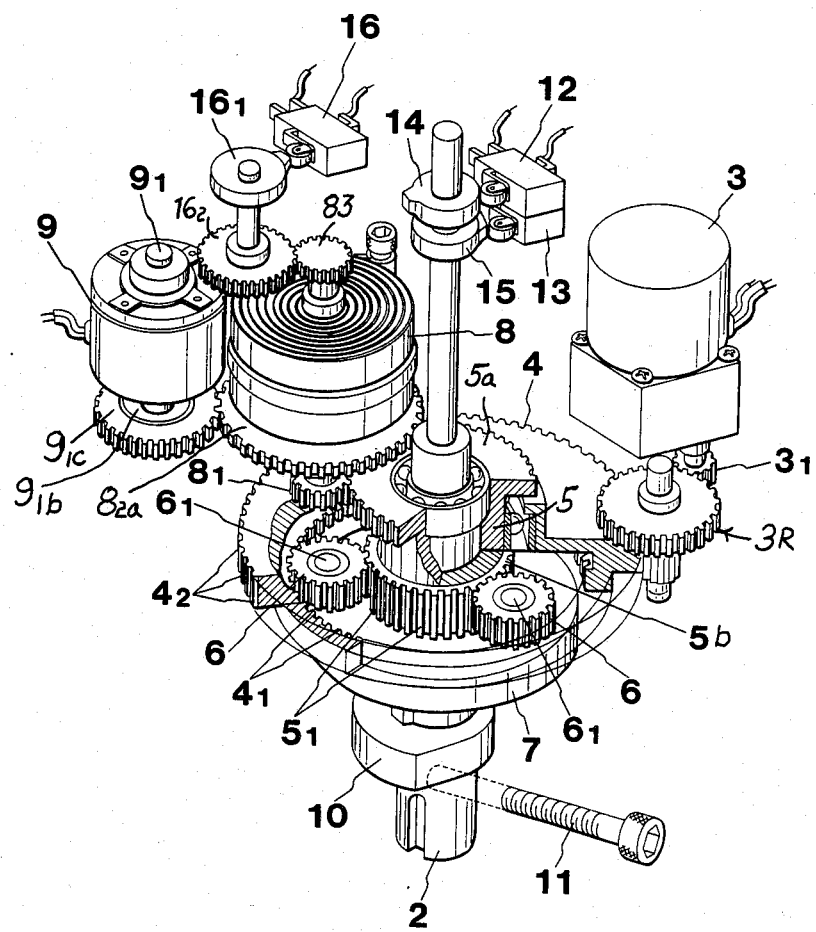
FIG. 3 is a perspective view showing an overall construction of the driving section as illustrated in FIG. 2.
Figure 4:
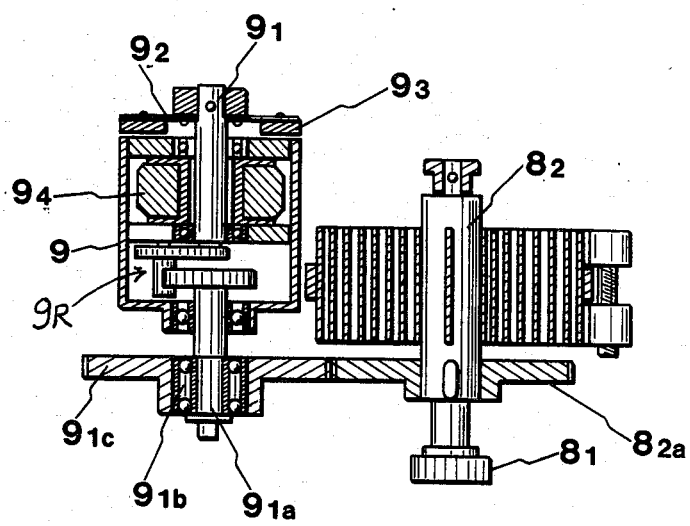
FIG. 4 is a fragmentary longitudinal side sectional view showing constructions of a spiral spring section and a magnet brake section employed in the motor driven valve of FIG. 1.

According to the present invention, a motor driven valve of the one preferred embodiment is so constructed that, in the motor driven valve adapted to selectively open or close the valve 1 by rotating an output shaft 2 connected to a rotary shaft of the valve body of said valve 1, for 90° in the forward or reverse direction through driving by a reversible motor 3, an internal gear 4 arranged to rotate independently of the output shaft 2 through rotation of the motor 3 is rotatably supported by said output shaft 2, and a plate 7 is fixed to the output shaft and on which there is journalled through a shaft 61, a gear 6 engaging inner peripheral teeth $4_1$ of said internal gear 4 and outer peripheral teeth $5_1$ of a gear 5 rotatably supported by the output shaft 2 to rotate independently of said output shaft, while a spiral spring 8 which is wound through rotation of said gear 6, and a magnet brake 9 which prevents said spiral spring 8 from rotation during energization and releases the rotation preventing action for said spiral spring upon shutting off the energization, are further provided.

The spiral spring 8 has its inner end piece fitted in a slit (not shown) formed in a rotary shaft $8_2$ integral with a gear $8_1$ in mesh with the upper portion $5a$ gear 5, and its outer end piece fixed to part of a casing A secured to a flange portion of the valve 1 for covering the entire valve unit so as to be wound by the rotation of the gear 5, and a plurality of spiral springs may be provided depending on necessity to increase the restoring force.

Meanwhile, the magnet brake 9 includes a rotary shaft $9_1$, a thin plate $9_2$, fixed to the upper end of said rotary shaft, a ring-shaped attracting plate $9_3$ fixed to said thin plate $9_2$, and an electro-magnet $9_4$ for magnetizing said attracting plate $9_3$, whereby upon energization of the electro-magnet $9_4$, the attracting plate $9_3$ is magnetically attracted onto the electro-magnet $9_4$ so as to prevent the rotary shaft $9_1$ from rotating. The magnet brake 9 is accommodated in the casing together with a reduction gear means 9R. Furthermore, the relation between the spiral spring 8 and the magnet brake 9 is such that a gear $8_{2a}$ fixed to the rotary shaft $8_2$ of the spiral spring 8 is driven by a gear $9_{1c}$ mounted through a one-way clutch $9_{1b}$ on a rotary shaft $9_{1a}$ connected via the reduction gear means 9R to the rotary shaft $9_1$ of the magnet brake 9, so that upon rotation of the rotary shaft $8_2$ of the spiral spring 8 in a direction to wind said spiral spring 8, the gear $9_{1c}$ is rotated idly by the action of the one-way clutch $9_{1b}$, while upon rotation in the reverse direction, said gear $9_{1c}$ is rotated with the rotary shaft $9_{1a}$. On the other hand, the lower end of the output shaft 2 is fitted in a bore formed in the upper end of a rotary shaft (not shown) of the valve body of the valve 1 so that the rotary shaft of the valve body is rotated through rotation of the output shaft 2, and it is so arranged that the forward or reverse rotation is possible within a range of 90° by a cam 10 fixed in the vicinity of the lower end of the output shaft 2 and a stopper 11 directed inwardly from out side the cam 10 at the lower end of the casing A. In the drawings, there are shown limit switches 12 and 13 which detect rotation of the output shaft 2 so as to transmit whether the valve 1 is opened or closed in the form of electrical signals with contacts of said limit switches 12 and 13 being arranged to be turned ON or OFF by cam plates 14 and 15 integrally fixed to the output shaft 2. There is also provided a limit switch 16 for detectng through cam 16, and gears $16_2$ and $8_3$ that the rotary shaft of the spiral spring 8 is rotated and the spiral spring has been fully wound, and it is so arranged that the exciting coil $9_4$ of the magnet brake 9 is energized by the turning ON of this limit switch, and also that the motor 3 to be described later is de-energized. There is also provided a gear $3_1$ integral with the rotary shaft of the motor 3, and engaged with the outer peripheral teeth $4_2$—of the internal gear 4 described earlier through a reduction gear means 3R so as to rotate said internal gear 4 by the driving of the motor 3, thereby constituting a speed reduction mechanism.

The specific use, functions and effects of the motor driven valve of the present invention will be described for the embodiment as illustrated with reference to the case where the valve is to be closed during power failure.

That is to say, in the state where the valve 1 is closed, when the motor 3 is rotated in the direction to close the valve, the internal gear 4 which is independent of the output shaft 2, starts rotation in a free state, with simultaneous rotation of the gear 6 which is in mesh with the inner peripheral teeth $4_1$—but since the plate 7 to which this gear 6 is journalled is integral with the output shaft 2, the gear 6 is rotated while maintaining this position. By the rotation of the gear 6, the gear 5 in mesh therewith and the gear $8_1$ engaged with said gear 5 are rotated, and thus, the spiral spring 8 is begun to be wound. When the spiral spring 8 has been fully wound, a cam plate $16_1$ engaged with the rotary shaft $8_2$ through gears $16_2$ and $8_3$ is rotated to kick the contact of the limit switch 16 so as to de-energize the motor 3 and simultaneously to energize the electro-magnet $9_4$, thereby preventing rotation of the rotary shaft $9_1$, i.e. the rotation of the rotary shaft $8_2$ of the spiral spring 8. In short, the spiral spring 8 is held in the wound state, i.e. in a state where energy has been accumulated. In this state, when the motor 3 is energized in a direction to open the valve 1, the internal gear 4 is rotated in the direction opposite to the previous direction, with the gear 6 engaged with the inner peripheral teeth $4_1$—thereof being also rotated. However, since the gear 5 in mesh with said gear 6 is held in the fixed state as described earlier, the gear 6 effects the so-called planetary motion through rotation, while revolving around the gear 5, and therefore, the plate 7 is rotated by being pushed by the shaft $6_1$ of the gear 6, with the output shaft 2 integral therewith being also rotated, thus resulting in the valve body of the valve 1 being turned in the opening direction. When the valve body is opened by the rotation of the output shaft 2 through 90°, any further rotation is prevented by the action of the stopper 11, while simultaneously, the contact of the limit switch 12 is turned off, thereby de-energizing the motor 3 to stop rotation thereof. Therefore, in the case where it is required to close the valve 1, when the motor 3 is energized in the direction to close the valve 1 for rotating the gear $3_1$, the internal gear 4 and the gear 6 are rotated in the reverse direction, and said gear 6 is subjected to the planetary motion in the direction opposite to the previous direction so as to turn the plate 7 in the reverse direction an thus, the output shaft 2 is rotated through 90° to close the valve body of the valve 1. Simultaneously with the closing of the valve body, the contact of the limit switch 13 is turned off to de-energize the motor 3, thereby stopping rotation of said motor 3.

Therefore, by the driving of the motor 3, the functions as described so far are repeated for the open/close control of the valve 1.

Accordingly, under the state where the valve 1 is open, if any trouble such as power failure or the like which makes it impossible to control the energization of the motor 3 should take place, the current fed to the electromagnet $9_4$ of the magnet brake 9 is cut off, and therefore, the attracting plate $9_3$ magnetically attracted to said electro-magnet is disengaged therefrom so as to be in a free state, thus also bringing the rotary shaft $8_2$ of the spiral spring 8 into a free state. Accordingly, by the restoring force i.e. the unwinding force of the spiral spring 8 wound by the operation as described earlier, the rotary shaft $8_2$ i.e. the gear 5 is rotated in the direction opposite to the direction to wind the spiral spring, and accordingly, the gear 6 in mesh with the outer peripheral teeth $5_1$—of the gear 5 is also rotated, but with the rotation of the motor 3 stopped, since the rotary axis of the motor 3, i.e. the gear $3_1$ is held in the fixed state as described earlier, with the internal gear 4 is also held in the fixed state, so that the gear 6 rolls because it is engaged with the inner peripheral teeth $4_1$—and the plate i.e. the output shaft 2 is pushed by the shaft $6_1$ so as to rotate in the direction to close the valve as previously stated, whereby the valve body is automatically closed.

After the energy supply is again available, the spiral spring 8 is wound by the procedure as stated previously so as to prepare for subsequent possible troubles such as power failure, etc.

It is to be noted here that in the foregoing embodiment, although the description is given with respect to the case where the valve is to be closed in, an emergency such as a power failure and the like, with respect to the case where the valve must be opened when the energization control is impossible, for example, during power failure as in the case where the valve is used for sprinklers, the position for mounting the cam may be altered so that the spiral spring will be wound during opening of the valve.

As is clear from the foregoing description, according to the motor driven valve of the present invention, since it is so arranged that the spiral spring is wound through utilization of the motor for effecting the open/close control of the valve, and when it becomes impossible to control the energization of the motor as in power failure, etc., said spiral spring is unwound so as to close or open the valve body of the valve, not only are troublesome procedures as in a manual winding of the spiral spring not required, but an expensive magnet clutch is not necessary, and thus, an improved motor driven valve incorporating an emergency open/close device can be provided at extremely low cost.

Moreover, owing to the employment of the magnet brake 9 for holding the spiral spring 8 in the energy accumulated state, a smoother functioning may be achieved than in the case where a ratchet mechanism is employed so as to release its retaining action by a solenoid, and there is an advantage that control is readily effected even when a large restoring force, of the spiral spring i.e. the unwinding force is applied. Furthermore, when the spiral spring 8 is unwound upon de-energization of the electro-magnet $9_4$ for the magnet brake 9, the rotary shaft $9_1$ i.e. the attracting plate $9_3$ is also rotated at high speeds, and in this case, if the brake is rapidly applied by the rotation of the rotary shaft for the valve body of the valve 1 through 90°, there is a danger that the reduction gear within the magnet brake will be damaged due to an undue force applied thereto be the inertia force of the attracting plate $9_3$. However, according to the present embodiment, since the one-way clutch $9_{1b}$ within the transmission mechanism is interpassed between the spiral spring 8 and the magnet brake 9, the attracting plate $9_3$ is idly rotated by the inertia force without applying a load on the reduction gear, even if the brake is rapidly applied. Meanwhile, if the number of the gears 6 journalled on the plate 7 is increased, a still smoother function may be expected.

It should be noted here that, in the foregoing embodiment, although the description has been given with reference to the case where the valve is to be closed for an emergency such as power failure or the like, if it is required to open the valve in the case where energization control is impossible as in power failure, etc., for example, as in the case where the motor driven valve is used as a valve for a sprinkler, the fixing position of the cam for the stopper may be so altered as to wind the spiral spring during opening of the valve.

What is claimed is:

1. In a motor driven valve (1) arranged to be selectively opened or closed by an output shaft (2) connected to a rotary shaft of a valve body of said valve (1) through 90° in a forward or reverse direction by driving of a reversible motor (3), the improvement comprising:
    an internal gear (4) rotatably supported on said output shaft (2) so as to be rotated independently of said output shaft through rotation of said motor (3),
    a plate (7) fixed to said output shaft (2),
    a gear shaft ($6_1$) rotatable supported on said plate (7),
    a gear (6) rotatably mounted on said gear shaft ($6_1$),
    said internal gear (4) having inner peripheral teeth ($4_1$),
    a gear (5) having outer peripheral teeth ($5_1$) supported on said output shaft (2) for rotation irrespective of the rotation of said output shaft,
    said gear (6) being in mesh with said teeth ($4_1$) and ($5_1$),
    a spiral spring (8) to be wound by the rotation of said gear (6), and
    a magnet brake (9) adapted to prevent unwinding of said spiral spring when it is energized and to release the spiral spring when it is de-energized.

* * * * *